United States Patent
Funderburk

(10) Patent No.: US 6,443,184 B1
(45) Date of Patent: Sep. 3, 2002

(54) RADIALLY LOADED, POPPET-TYPE CHECK VALVE

(75) Inventor: Robert V. Funderburk, Salisbury, NC (US)

(73) Assignee: Conbraco Industries, Inc., Matthews, NC (US)

(*) Notice: Subject to any disclaimer, the term of this patent is extended or adjusted under 35 U.S.C. 154(b) by 33 days.

(21) Appl. No.: 09/625,682

(22) Filed: Jul. 25, 2000

(51) Int. Cl.$^7$ ............................................. F16K 15/00
(52) U.S. Cl. ...................... 137/535; 137/529; 251/337
(58) Field of Search ................................ 137/535, 512, 137/527, 527.4, 527.2, 529; 251/85, 87, 337, 303

(56) References Cited

U.S. PATENT DOCUMENTS

| | | | |
|---|---|---|---|
| 1,152,280 A | * 8/1915 | Boy | 137/529 |
| 1,278,133 A | 9/1918 | Gammeter | |
| 2,244,373 A | 6/1941 | Powers | |
| 2,332,604 A | 10/1943 | Roth et al. | |
| 2,547,882 A | * 4/1951 | Norton | 137/535 |
| 3,895,647 A | 7/1975 | Willenbrock et al. | |
| 4,109,819 A | 8/1978 | Kushman et al. | |
| 4,298,023 A | 11/1981 | McGinnis | |
| 4,357,954 A | 11/1982 | Hunter | |
| 4,712,619 A | 12/1987 | Stepp et al. | |
| 4,795,129 A | 1/1989 | Clark | |
| 4,946,009 A | 8/1990 | Knutson | |
| 4,989,635 A | * 2/1991 | Dunmire | 137/527 |
| 5,577,533 A | 11/1996 | Cook, Jr. | |
| 5,913,331 A | 6/1999 | Noll et al. | |

FOREIGN PATENT DOCUMENTS

| | | | | |
|---|---|---|---|---|
| CA | 545595 | * | 9/1957 | 137/535 |
| GB | 2140 | * | 6/1873 | 137/535 |

OTHER PUBLICATIONS

Zurn Plumbing Products Group—Wilkins Operation; Compound Check Closure Product Bulletin; Entire Publication; May, 1999.

* cited by examiner

Primary Examiner—Michael Powell Buiz
Assistant Examiner—Meredith H. Schoenfeld
(74) Attorney, Agent, or Firm—Adams, Schwartz & Evans, P.A.

(57) ABSTRACT

A poppet-type check valve for controlling fluid flow including a valve housing having an interior and first and second ports therein communicating with the interior of said valve housing for permitting fluid flow from an upstream side to a downstream side thereof and at least one valve assembly disposed within the interior of the valve housing for controlling the fluid flow therethrough. The valve assembly includes a valve seat positioned in the interior of the valve housing, and a seal retainer positioned in the interior of the valve housing downstream from the valve seat and mounted on a stem. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. A plurality of springs are pivotally mounted in the interior of the valve housing interconnecting the valve housing and stem for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

18 Claims, 13 Drawing Sheets

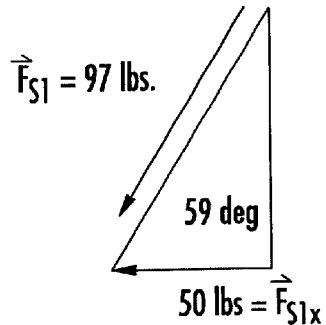
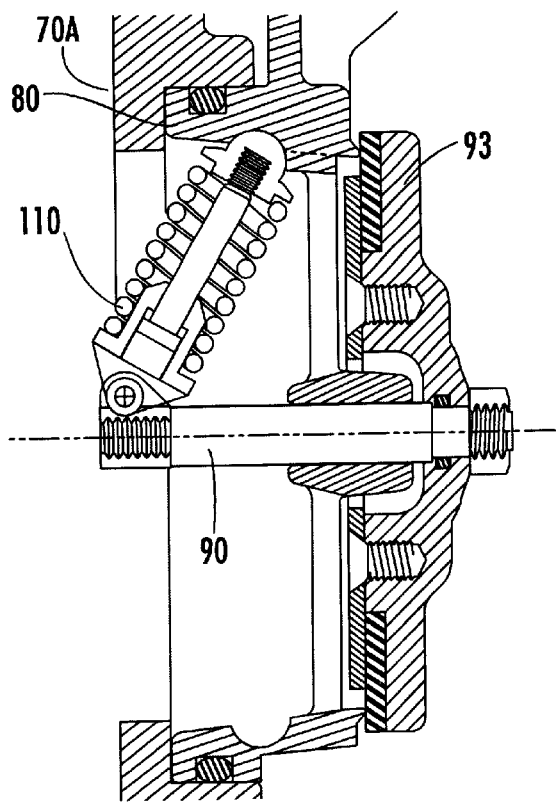
*FIG. 8A.*
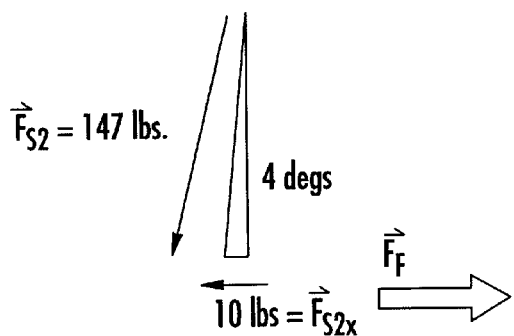
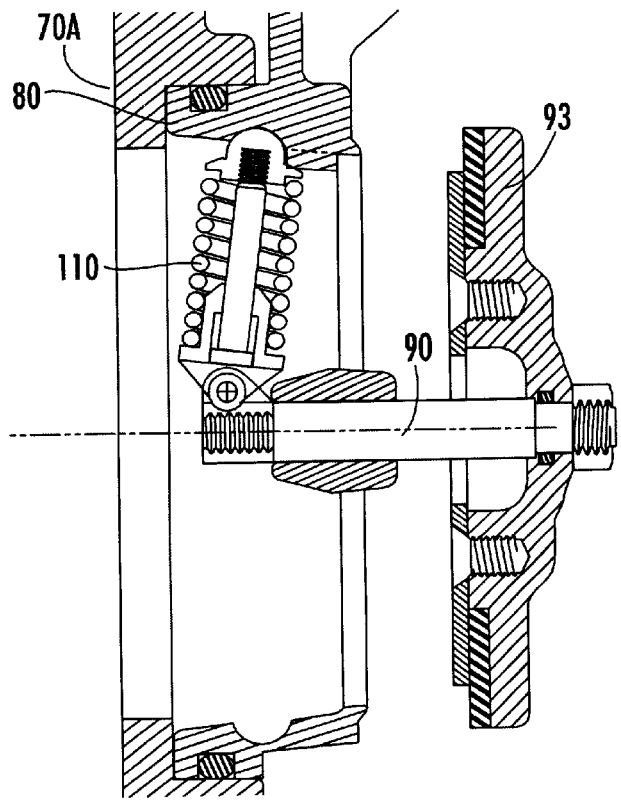
*FIG. 8B.*

RADIALLY LOADED, POPPET-TYPE CHECK VALVE

TECHNICAL FIELD AND BACKGROUND OF THE INVENTION

This invention relates to a type of valve known as a "backflow preventer check valve." These types of check valves are well known and are widely used to control backflow of fluids carrying undesirable contaminants into a fluid supply. These valves have evolved to become highly specialized in their function and operation, and are similar in that they all contain spring-loaded members which are biased towards the valve-closed position until fluid pressure acting on the checking members forces the valves open. Although the invention of the present application may be used in any suitable environment in which the flow of liquids must be controlled, the invention is preferably intended for use on a backflow preventer, which is a well-known device commonly used to protect potable water supplies from pollutants originating from downstream sources. A typical backflow preventer has two spring-loaded check valves positioned in conventional serial combination within a vessel body for preventing backflow of a fluid.

Many prior art spring-loaded check valves are of a poppet type, and include checking members whose movement is linear and remains in the fluid path. The pressure required to open such check valves is established by regulation and provides a minimum degree of protection against reverse flow. To provide some degree of protection, the springs in spring-loaded check valves provide a static differential pressure drop and corresponding static energy while the check valves are in a closed, or "no flow," condition. The pressure and corresponding energy required to open these check valves is provided by the fluid and is created at the source by, for example, a pump. As fluid flows through the valve, both the differential pressure drop and corresponding energy change from static to dynamic. The total dynamic energy of the fluid in motion through the check valves is reduced by friction within the pipes and other obstacles (including the checking members) which remain disposed directly in the fluid path within the fluid conduit system. Once it increases beyond a certain amount, this loss of dynamic energy, also known as "headloss," is no longer beneficial. Unfortunately, due to the position and linear movement of the springs within typical spring-loaded check valves, as headloss increases, fluid pressure decreases. This results in reduced fluid flow.

The invention of the present application addresses the problem of uncontrolled headloss by providing a poppet-type check valve which includes radially-loaded springs. Unlike a typical spring-loaded check valve, which has a spring loaded along the horizontal axis of a corresponding valve stem, the check valve of the present invention includes three springs, each of which is loaded within the check valve in radial relation to the other springs such that one end of the spring is attached to, and the other end extends outwardly from, the valve stem. By taking advantage of radial placement and careful angling in relation to the stem, the radially loaded springs included in the invention of the present application maintain a force on the poppet which is adequate to keep the poppet closed during static, "no-flow" conditions, yet decreases as fluid flow increases through the check valve. Positioning the springs in this manner reduces head loss, and preserves both fluid pressure and flow.

SUMMARY OF THE INVENTION

Therefore, it is an object of the invention to provide a radially loaded, poppet-type check valve which reduces "head loss."

It is another object of the invention to provide a poppet-type check valve having springs positioned to allow spring loading to decrease as the check valve opens.

It is another object of the invention to provide a poppet-type check valve which provides a static differential pressure drop for providing protection against reverse fluid flow.

It is another object of the invention to provide a poppet-type check valve that allows the resultant force of the springs acting on the poppet to be adequate when the check valve is closed in a static, "no-flow" condition, and then to decrease as fluid flow increases and the check valve opens.

These and other objects of the present invention are achieved in the preferred embodiments disclosed below by providing a poppet-type check valve for controlling fluid flow including a valve housing having an interior and first and second ports therein communicating with the interior of the valve housing for permitting fluid flow from an upstream side to a downstream side thereof. At least one valve assembly is disposed within the interior of the valve housing for controlling fluid flow therethrough. The valve assembly includes a valve seat positioned in the interior of the valve housing, and a seal retainer positioned in the interior of the valve housing downstream from the valve seat and mounted on a stem. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. A plurality of springs are pivotally mounted in the interior of the valve housing and interconnect the valve housing and stem for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According to one preferred embodiment of the invention, a poppet-type check valve for controlling fluid flow is disclosed, comprising a valve housing having an interior and first and second ports therein communicating with the interior of the valve housing for permitting fluid flow from an upstream side to a downstream side thereof. At least one valve assembly is disposed within the interior of the valve housing for controlling fluid flow therethrough. The valve assembly includes a valve seat positioned in the interior of the valve housing, a stem guide mounted on a downstream side of the valve seat, and a seal retainer mounted on an upstream end of a stem which extends downstream from the valve seat and through the stem guide. The seal retainer and the stem are axially moveable away from the valve seat in response to fluid flow in a downstream direction, axially movable toward the valve seat in response to fluid flow in an upstream direction, and in sealing engagement against the valve seat in the absence of fluid flow. The valve assembly also includes a plurality of springs pivotally mounted in the interior of the valve housing. The springs interconnect the stem and the stem guide downstream from the seal retainer for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According to another preferred embodiment of the invention, a poppet-type check valve for controlling fluid flow is disclosed, comprising a valve housing having an interior and first and second ports therein communicating with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing, and a stem guide mounted on a downstream side of the valve seat. A stem is positioned within the valve seat and includes a first end extending upstream from the valve seat, and a second end extending downstream from the valve seat through the stem guide. A seal retainer is mounted on the stem intermediate with the first and second ends and positioned downstream from the valve seat. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. The valve assembly also includes a plurality of springs pivotally mounted in the interior of the valve housing. The springs interconnect the valve housing and the first end of the stem for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According to yet another preferred embodiment of the invention, a poppet-type check valve for controlling fluid flow is disclosed, comprising a valve housing having an interior and first and second ports therein which communicate with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing, a stem having a first end extending through and upstream from the valve seat and a second end positioned within the valve seat. A seal retainer is mounted on the second end and positioned downstream from the valve seat. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. The valve assembly also includes a plurality of springs pivotally mounted in the interior of the valve housing. The springs interconnect the valve housing and the seal retainer for normally maintaining the seal retainer in sealing engagement with the valve seat in the absence of fluid flow. The springs are positioned in radial opposition to one another and extend outwardly from the seal retainer in the downstream direction to cause the seal retainer to move away from the valve seat in response to fluid flow in the downstream direction, thereby increasing the force of the seal retainer on the springs and causing the springs to pivot and compress to produce a diminishing resultant spring load on the seal retainer.

According to yet another preferred embodiment of the invention, a backflow preventer for to protecting fluid sources from pollutants is disclosed, comprising at least one poppet-type check valve for controlling fluid flow removably mounted therein. The check valve includes a valve housing having an interior and first and second ports therein which communicate with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing and a seal retainer positioned in the interior of the valve housing downstream from the valve seat and mounted on a stem. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. A plurality of springs are pivotally mounted in the interior of the valve housing. The springs interconnect the valve housing and stem for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According to yet another preferred embodiment of the invention, a backflow preventer for protecting fluid sources from pollutants is disclosed comprising at least one poppet-type check valve for controlling fluid flow removably mounted therein. The check valve includes a valve housing having an interior and first and second ports therein and communicating with the interior of the valve housing for permitting fluid flow from an upstream side to a downstream side thereof. At least one valve assembly is disposed within the interior of the valve housing for controlling the fluid flow in therethrough. The valve assembly includes a valve seat positioned in the interior of the valve housing and a stem guide mounted on a downstream side of the valve seat. A seal retainer is mounted on an upstream end of a stem extending downstream from the valve seat and through the stem guide. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. A plurality of springs are pivotally mounted in the interior of the valve housing and interconnect the stem and the stem guide downstream from the seal retainer for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According yet another preferred embodiment of the invention, a backflow preventer for protecting fluid sources from pollutants is disclosed, comprising at least one poppet-type check valve for controlling fluid flow removably mounted therein. The check valve includes a valve housing having an interior and first and second ports therein which communicate with the interior of the valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing and a stem guide mounted on a downstream side of the valve seat. A stem is positioned within the valve seat and includes first and second ends extending upstream from the valve seat and downstream from the valve seat through the stem guide, respectively. A seal retainer is mounted on the stem intermediate with the first and second ends and positioned downstream from the valve seat. The seal retainer and the stem are axially moveable away from the valve seat in response to fluid flow in a downstream direction, axially moveable toward the valve seat in response to fluid flow in an upstream direction, and in sealing engagement against the valve seat in the absence of fluid flow. A plurality of springs are pivotally mounted in the interior of the valve housing and interconnect the valve housing and the first end of the stem for normally maintaining the seal retainer in sealing engagement with the valve seat in the absence of fluid flow. The springs are positioned in radial opposition to one another and extend outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

According to yet another embodiment of the present invention, a backflow preventer for protecting fluid sources from pollutants is disclosed, comprising at least one poppet-type check valve for controlling fluid flow removably mounted therein. The check valve includes a valve housing having an interior and first and second ports therein communicating with the interior of said valve housing for permitting fluid flow from an upstream side to a downstream side thereof. At least one valve assembly is disposed within the interior of the valve housing for controlling the fluid flow therethrough. The valve assembly includes a valve seat positioned in the interior of the valve housing and a stem having a first end extending through and upstream from the valve seat, and a second end positioned within the valve seat. A seal retainer is mounted on the second end and is positioned downstream from the valve seat. The seal retainer and the stem are axially moveable away from the valve seat in response to fluid flow in a downstream direction, axially moveable toward the valve seat in response to fluid flow in an upstream direction, and are in sealing engagement against the valve seat in the absence of fluid flow. A plurality of springs are pivotally mounted in the interior of the valve housing and interconnect the valve housing and the seal retainer for normally maintaining the seal retainer in sealing engagement with the valve seat in the absence of fluid flow. The springs are positioned in radial opposition to one another and extend outwardly from the seal retainer in the downstream direction to cause the seal retainer to move away from the valve seat in response to fluid flow in the downstream direction, thereby increasing the force of the seal retainer on the springs and causing the springs to pivot and compress to produce a diminishing resultant spring load on the seal retainer.

According to yet another preferred embodiment of the invention, each of the springs is positioned for being axially compressed and expanded while pivoting between two angles responsive to the movement of the seal retainer. Each of the angles is oblique to the direction of fluid flow through the valve housing.

According to yet another preferred embodiment of the invention, the valve assembly includes three springs, each of the springs having first and second ends.

According to yet another preferred embodiment of the invention, the springs are positioned in equally-spaced relation to one another.

According to yet another preferred embodiment of the invention, the first ends are positioned on the stem in equally-spaced relation to one another, and the second ends are positioned 120 degrees apart from one another and extend downstream from said first ends.

Preferably, the springs are compression springs.

BRIEF DESCRIPTION OF THE DRAWINGS

Some of the objects of the invention have been set forth above. Other objects and advantages of the invention will appear as the invention proceeds when taken in conjunction with the following drawings, in which:

FIGS. 8A and 8B are fragmentary, cross sectional views of one of the check valves shown in FIGS. 3 and 4 in its no-flow and full-flow conditions, respectively;

DESCRIPTION OF THE PREFERRED EMBODIMENT AND BEST MODE

Figure 1:
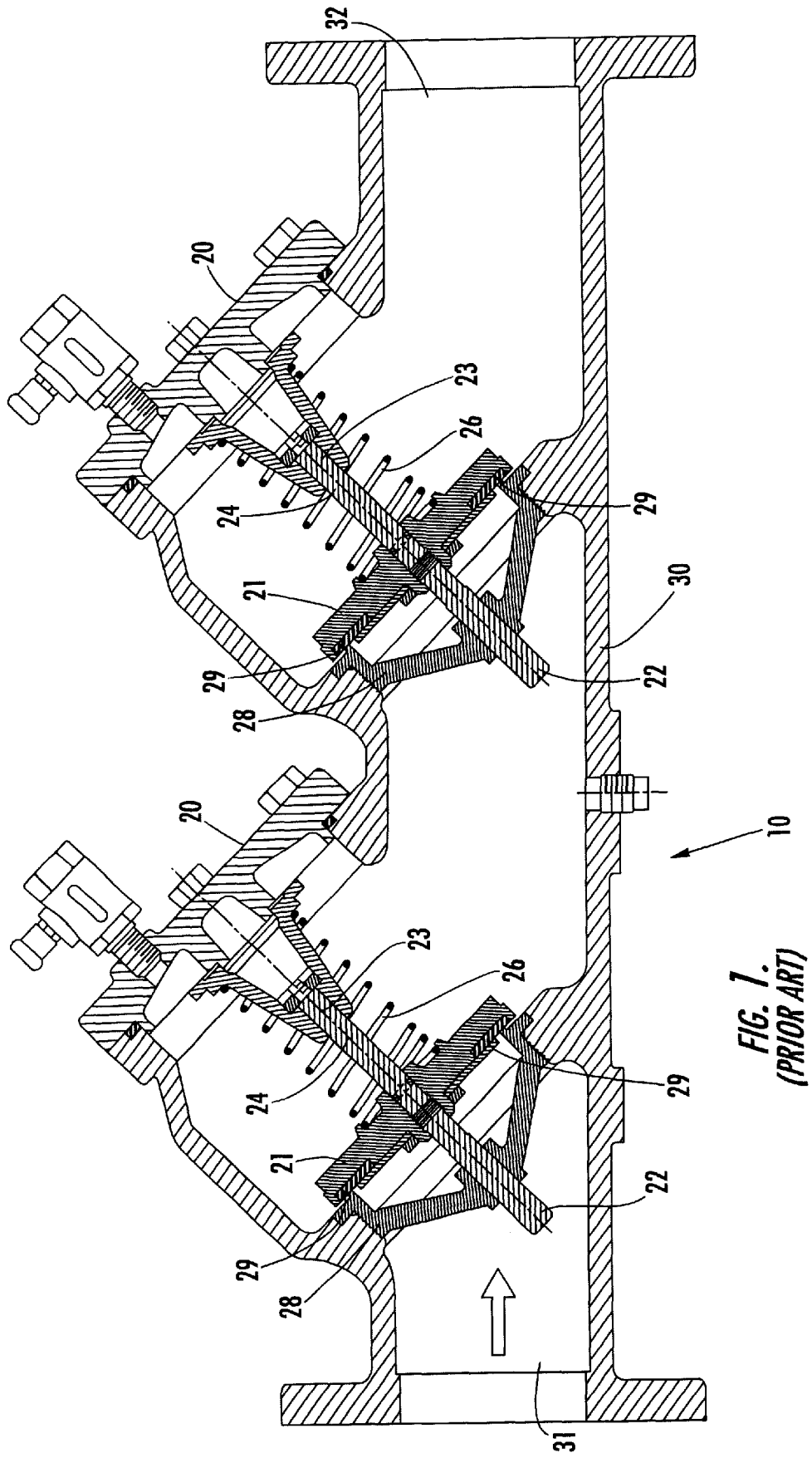
FIG. 1 is a vertical cross sectional view of a typical prior art poppet-type check valve.

Referring now specifically to the drawings, a prior art spring-loaded backflow preventer is illustrated in FIG. 1 and shown generally at reference numeral 10. The prior art backflow preventer 10 includes two identical poppet-style check valve assemblies 20 housed within a valve body 30 which has a fluid inlet 31 and a fluid outlet 32. Each valve assembly 20 is shown in a closed position, and includes a seal retainer 21 positioned intermediate with the first and second ends, 22 and 23, of a center guide stem 24. As is shown in FIG. 1, a compression spring 26 extends along the longitudinal axis of the guide stem 24 for biasing the seal retainer 21 in the closed position against a stationary valve seat 28. The seal retainer 21 includes a rubber seal 29 which seals against the seat 28 when the valve assembly 20 is closed. Each seat 28 is the only conduit in the valve body 30 through which fluid may pass, which causes each valve assembly 20 to be the only means of flow control in the prior art valve 10.

Figure 2:
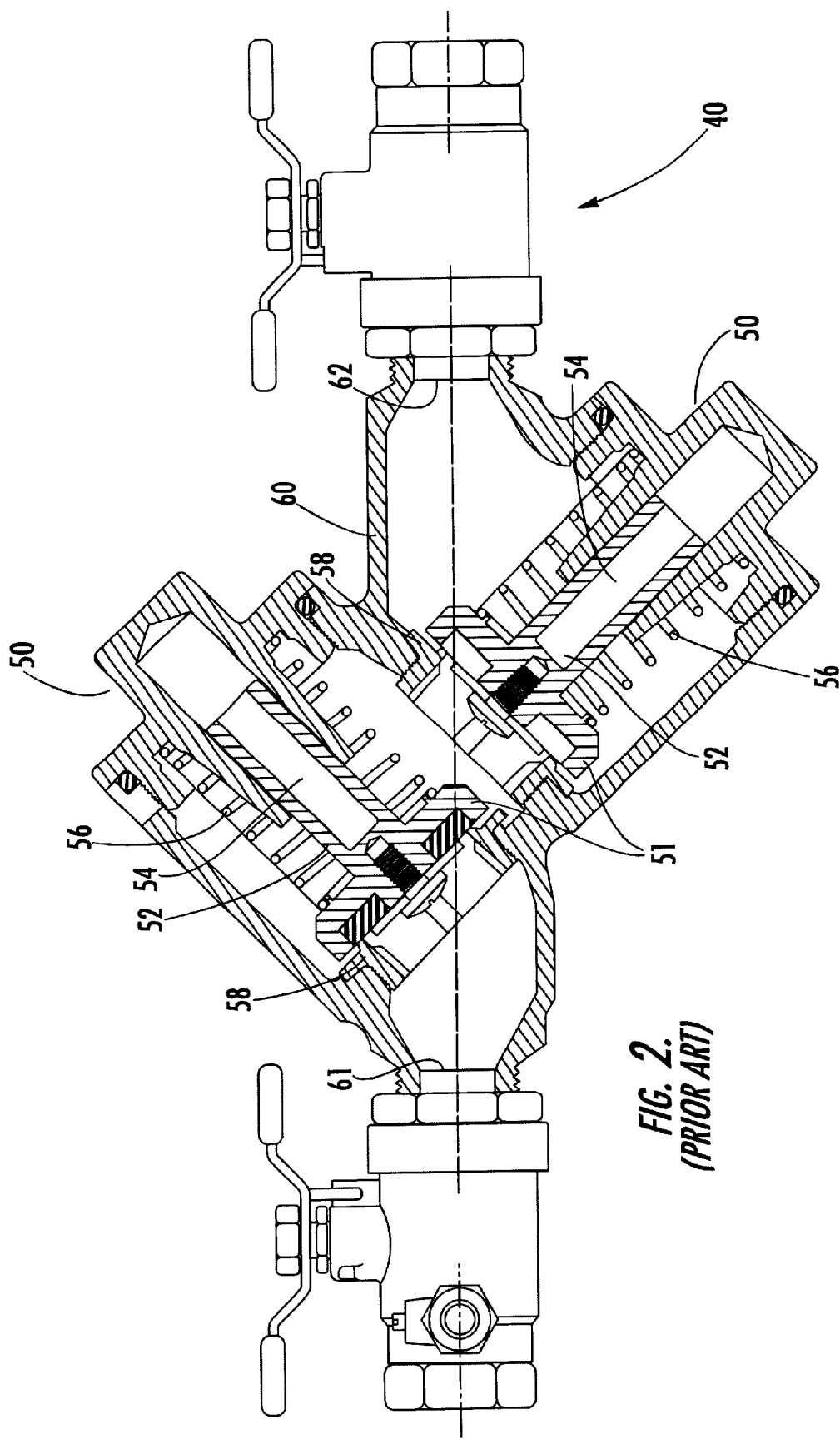
FIG. 2 is a vertical cross sectional view of another typical prior art poppet-type check valve.

Referring now to FIG. 2, another prior art spring-loaded backflow preventer is illustrated and shown generally at reference numeral 40. Like the prior art backflow preventer 10, the prior art backflow preventer 40 includes two identical poppet-style check valve assemblies 50 housed within a valve body 60. The valve body 60 has a fluid inlet 61 and a fluid outlet 62. Each valve assembly 50 includes a seal retainer 51 attached to the first end 52 of a center guide stem 54. A compression spring 56 extends along the longitudinal axis of the guide stem 54 for biasing the seal retainer 51 in a closed position against a stationary valve seat 58 when fluid is not flowing through the inlet 61 and against the seat 58.

While the components of the valve assemblies 20 and 50 are similar, the manner in which the assemblies 20 and 50 are positioned within the respective valve bodies 30 and 60 differs. In FIG. 1 the valve assemblies 20 are positioned so that the guide stems 24 are parallel to one another. In contrast, the valve assemblies 50 shown in FIG. 2 are positioned so that the guide stems 54 are perpendicular to each other. Despite this difference, the prior art backflow preventers 10 and 40 share the well-known problem of creating excess dynamic head loss, which increases proportionately as the rate of fluid flow increases. This problem is caused not only by the naturally-occurring force of friction between the surfaces of the backflow preventer components and the fluid as it contacts those components, but also by redirecting the path of the fluid through and around any one of the check valve assemblies 20 and 50. Furthermore, the problem of increased dynamic head loss is exacerbated by the linear alignment of the compression springs 26 and 56 along the longitudinal axes of respective guide stems 24 and 54. Using the prior art backflow preventer 10 shown in FIG. 1 as an example, positioning each compression spring 26 along the longitudinal axis of the guide stem 24 causes the spring 26 to compress and exert an increasing linear force on the seal retainer 21 as the seal retainer 21 opens. This increased linear force causes the dynamic head loss to increase. While the effects of the force of friction and of redirecting the path of the fluid discussed above should not be disregarded, the increased linear force created by the positioning of the springs 26 and 56 along the longitudinal axes of respective guide stems 24 and 54 is the primary factor contributing to the dynamic head loss problems inherent in the prior art valves shown in FIGS. 1 and 2.

Figure 3:
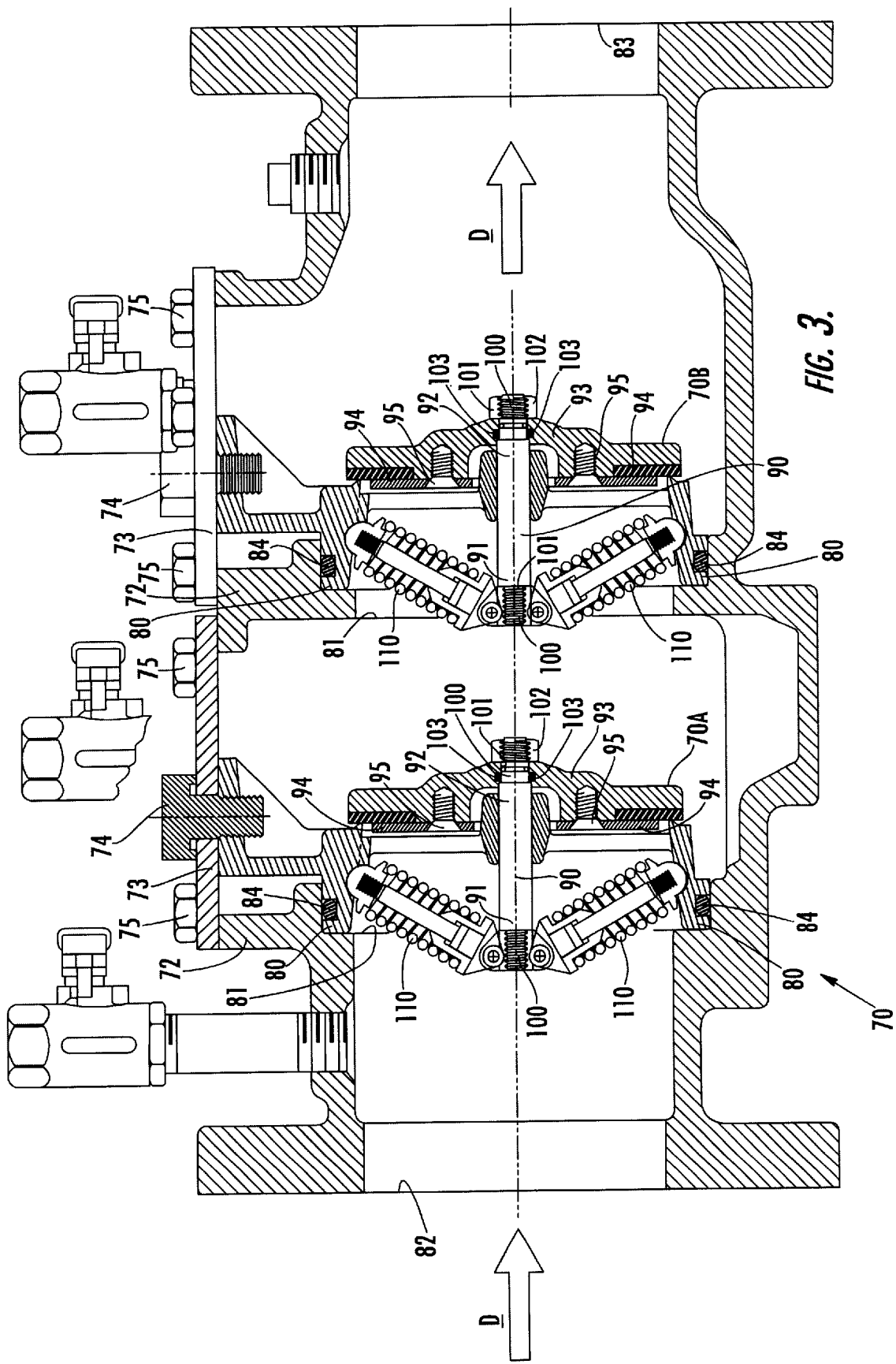
FIG. 3 is a cut-away, vertical, cross sectional view of a radially loaded, poppet-type check valve according to an embodiment of the present invention in a no-flow condition.

Referring now to FIG. 3, a radially loaded, poppet-type backflow preventer according to one preferred embodiment of the present invention is illustrated and shown generally at reference numeral 70. The backflow preventer 70 includes two identical check valve assemblies 70A and 70B positioned in series within the same valve housing 72. As shown in FIGS. 1 and 2, placing two check valves within a valve housing is well known in the art, and will thus not be described in detail.

Regulations governing the design, manufacture, installation and maintenance of backflow preventers require that check valves and associated parts be removable for inspection and repair in the field without removing the valve housing from the water line. Valve housing 72 thus includes two housing covers 73 which are removably attached by bolts 74 and nuts 75 to the valve housing 72. Attaching the housing covers 73 in this manner permits access to the interior of the valve housing 72.

Each valve assembly 70A and 70B includes a valve seat 80 frictionally positioned within a port 81 of the valve housing 72. Fluid which is to be controlled by the valve assemblies 70A and 70B normally flows through the valve seat 80 from inlet conduit 82 and outlet conduit 83 upstream to downstream in the direction ("D") shown. An o-ring 84 is positioned in an annular o-ring groove and forms a fluid seal between the valve seat 80 and the valve housing 72. The valve assemblies 70A and 70B also each include a horizontally-oriented stem 90 mounted in the interior of the valve housing 72. The stem 90 has first and second respective ends 91 and 92. A seal retainer 93 is positioned on the second end 92 and engages the valve seat 80. The seal retainer 93 is attached to the second end 92 by a threaded bolt 100. The bolt 100 is received in a threaded bore 101, which is defined in and extends through the seal retainer 93 and stem 90. A nut 102 secures the bolt 100 to the seal retainer 93. An o-ring 103 is positioned in an annular o-ring groove and forms a fluid seal between the second end 92 and the bore 101. The seal retainer 93 preferably includes two rubber faces 94 which are attached to the seal retainer 93 by two screws 95. Each rubber face 94 is for providing an enhanced seal between the seal retainer 93 and the valve seat 80.

Figure 4:
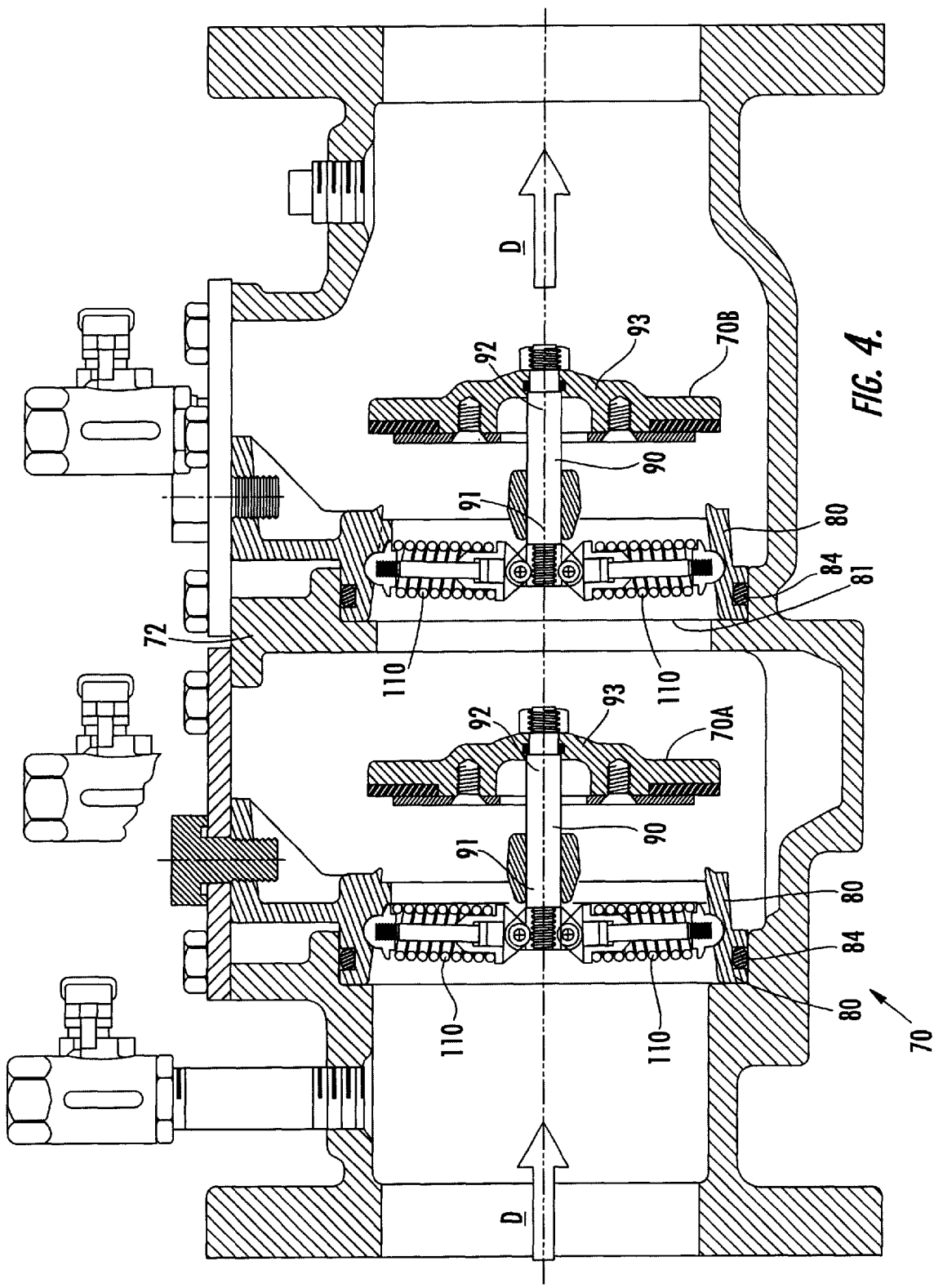
FIG. 4 is a cut-away, vertical, cross sectional view of the radially loaded, poppet-type check valve shown in FIG. 3 in a full-flow condition.

The seal retainer 93 is movable between a closed position shown in FIG. 3, in which the seal retainer 93 engages the valve seat 80, and an open position shown in FIG. 4, in which the stem 90 is moved in a direction downstream from the valve seat 80, which in turn causes the seal retainer 93 to be moved out of engagement with the valve seat 80. When the seal retainer 93 is in abutting engagement with the valve seat 80, a fluid-tight seal is formed for preventing fluid backflow. As is shown in FIG. 4, however, moving the seal retainer 93 out of engagement with the valve seat 80 permits fluid to flow freely therethrough.

Figure 6:
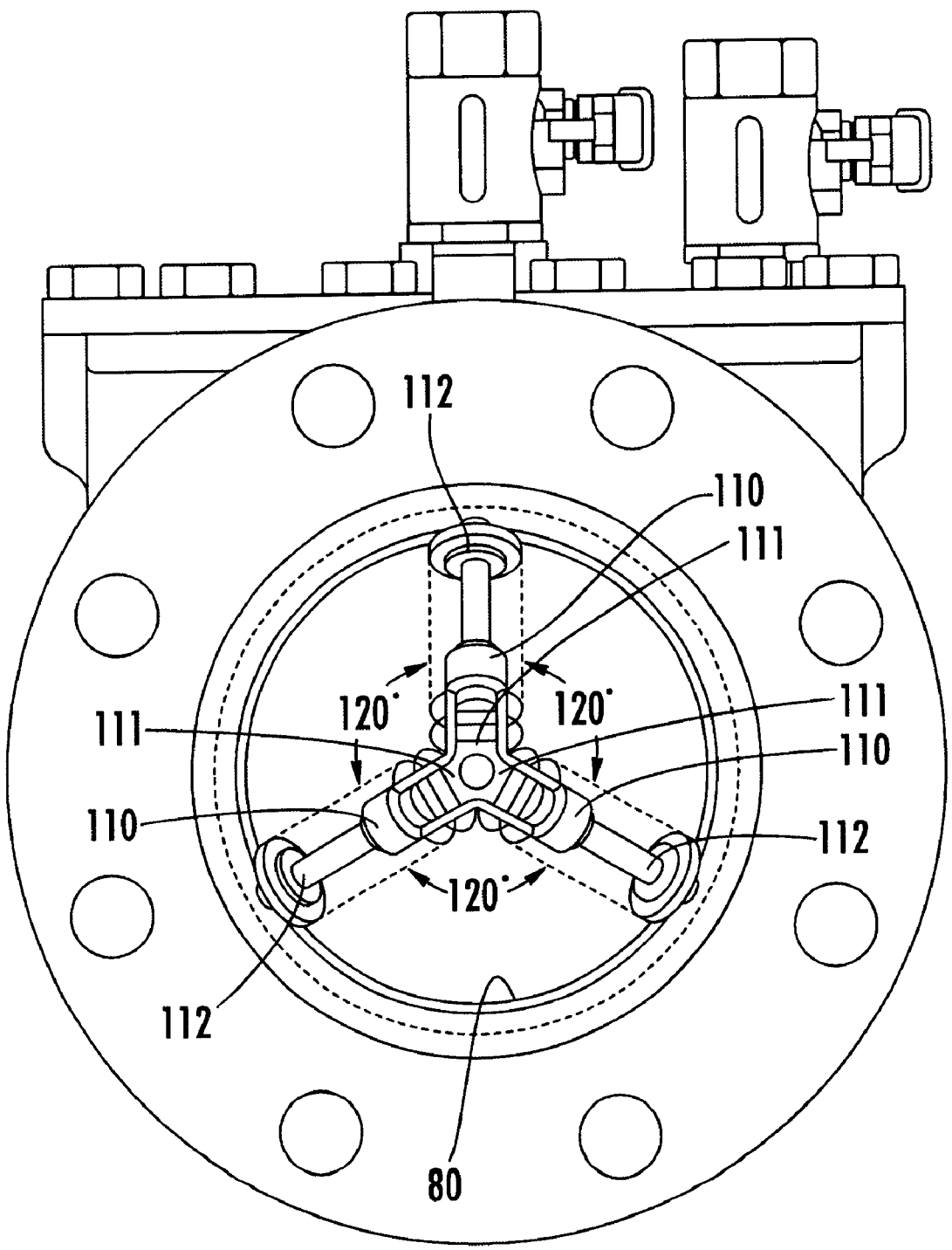
FIG. 6 is an end view of the inlet of the radially loaded, poppet-type check valve shown in FIGS. 3 and 4.

FIGS. 3 and 4 show the seal retainer 93 being moved in and out of engagement with the valve seat 80 by pivotally-mounted springs 110. Although any suitable spring may be used, each spring 110 is preferably a compression spring. As shown in FIGS. 1 and 2 above, the general use of compression springs in backflow preventers is well known in the art. The novelty of the invention of the present application thus does not reside in merely choosing to use compression springs, but instead resides in the unique manner in which the springs 110 are positioned and function within each of the valve assemblies 70A and 70B. While only two springs 110 are positioned within each of the valve assemblies 70A and 70B shown in FIGS. 3 and 4, as is shown in FIG. 6, the use of three springs 110 in each valve assembly 70A and 70B is preferred.

Figure 5:
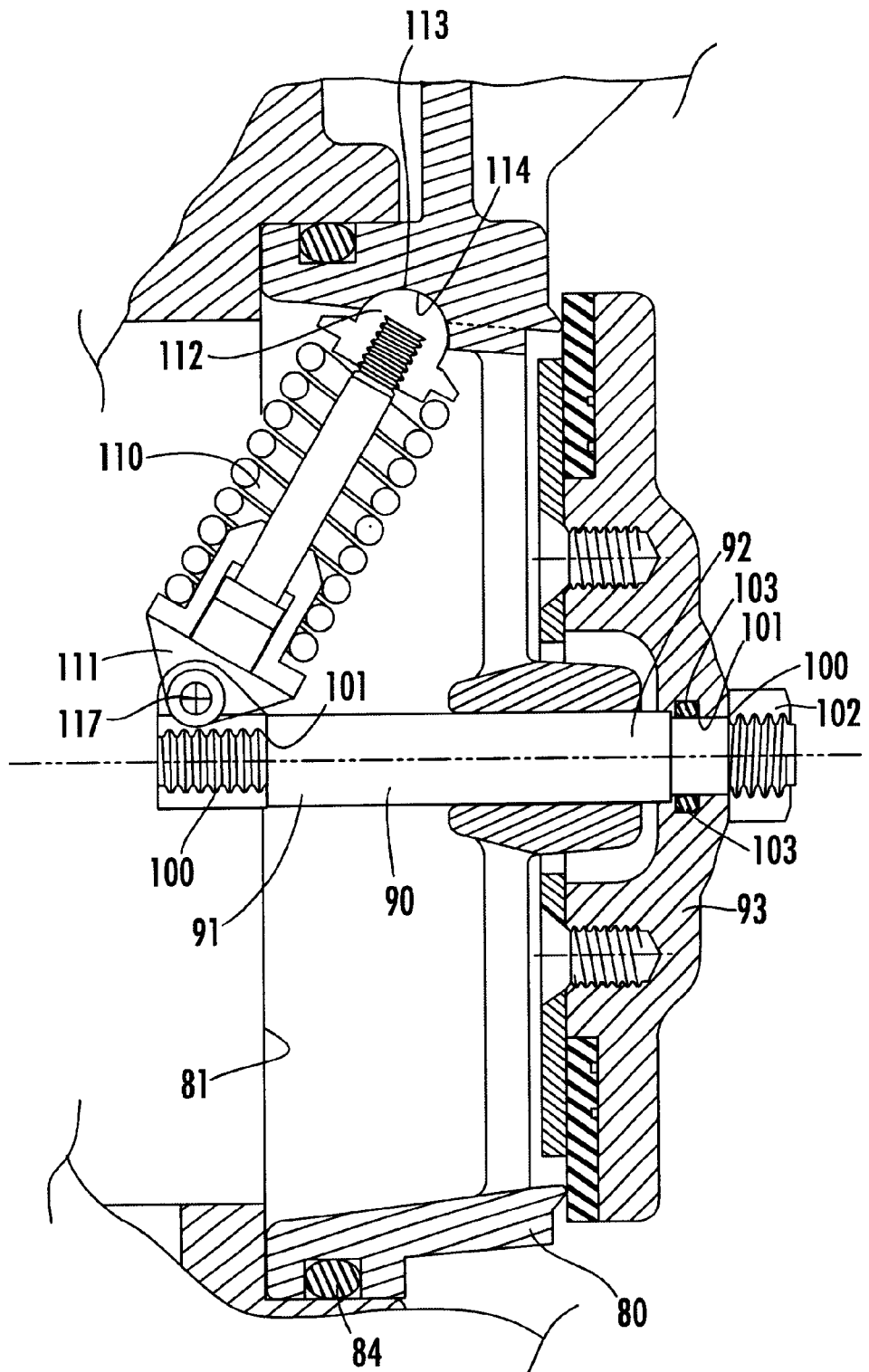
FIG. 5 is a fragmentary cross sectional view of a radially loaded spring included in one of the check valve assemblies shown in FIG. 3.

Referring now to FIG. 5 and using valve assembly 70A as an example, a single spring 110 is shown positioned within the valve seat 80. The spring 110 includes a hinged end 111 and spherically-shaped end 112. End 112 carries a pivot in the form of a convex surface 113. The convex surface 113 engages a concave surface 114 formed on an inside surface of the valve seat 80, thereby permitting end 112 to pivot in any direction. Hinged end 111 is preferably a knuckle joint. The first end 91 of the stem 90 and the hinged end 111 define respective holes 115 and 116 (not shown), which are adapted for receiving a complementary hinge pin 1 17 therethrough. As is shown in FIG. 6, attaching the hinged ends 111 of the three springs 110 to the first end 91 in this manner and positioning the ends 112 in equally-spaced relation to each other around the inner edge of the valve seat 80 causes the springs 110 to radiate outwardly from the stem 80 at 120° angles to each other. In addition, as is shown in FIGS. 3 and 4, the hinged ends 111 of the springs 110 are positioned on the first end 91 of the stem 90 upstream from the point at which the convex surface 113 on each of the spherically-shaped ends 112 communicates with a respective concave surface 114. As discussed in greater detail below, positioning the springs 110 at an oblique angle to the stem 90 in this manner has a profound effect upon the resultant forces produced by the springs 110.

Figure 7A:
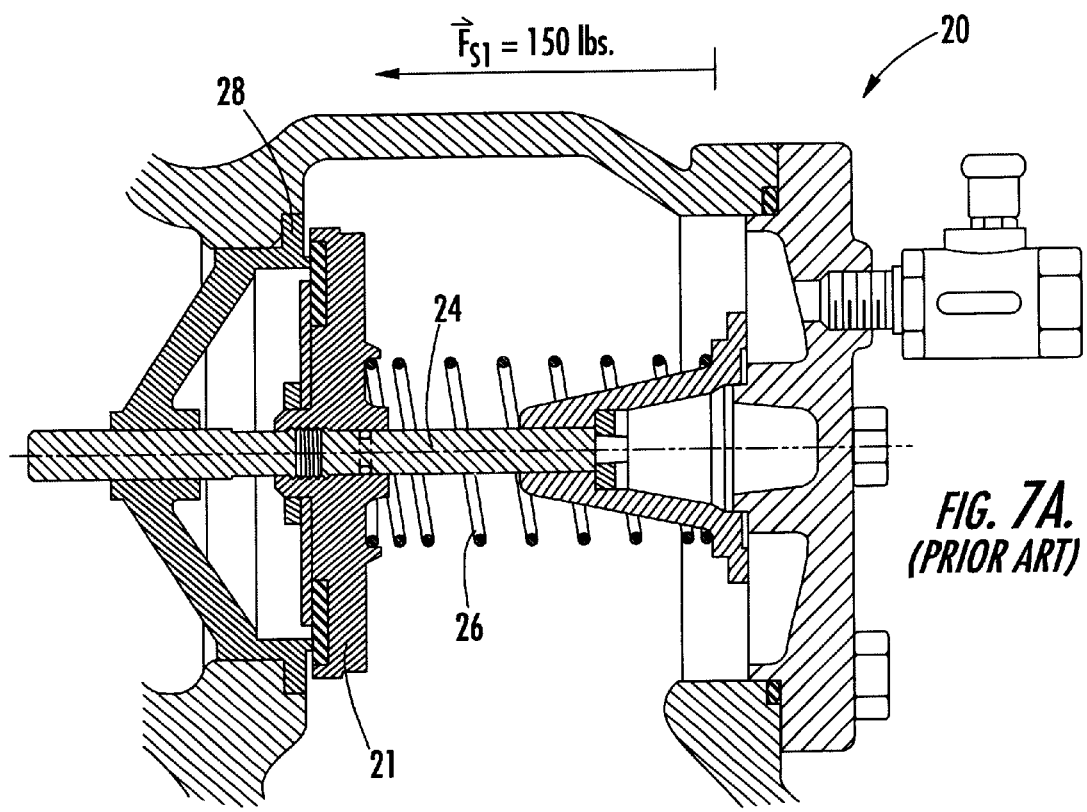
FIGS. 7A and 7B are fragmentary cross sectional views of one of the prior art check valves shown in FIG. 1 in its no-flow and full-flow conditions, respectively.
Figure 7B:
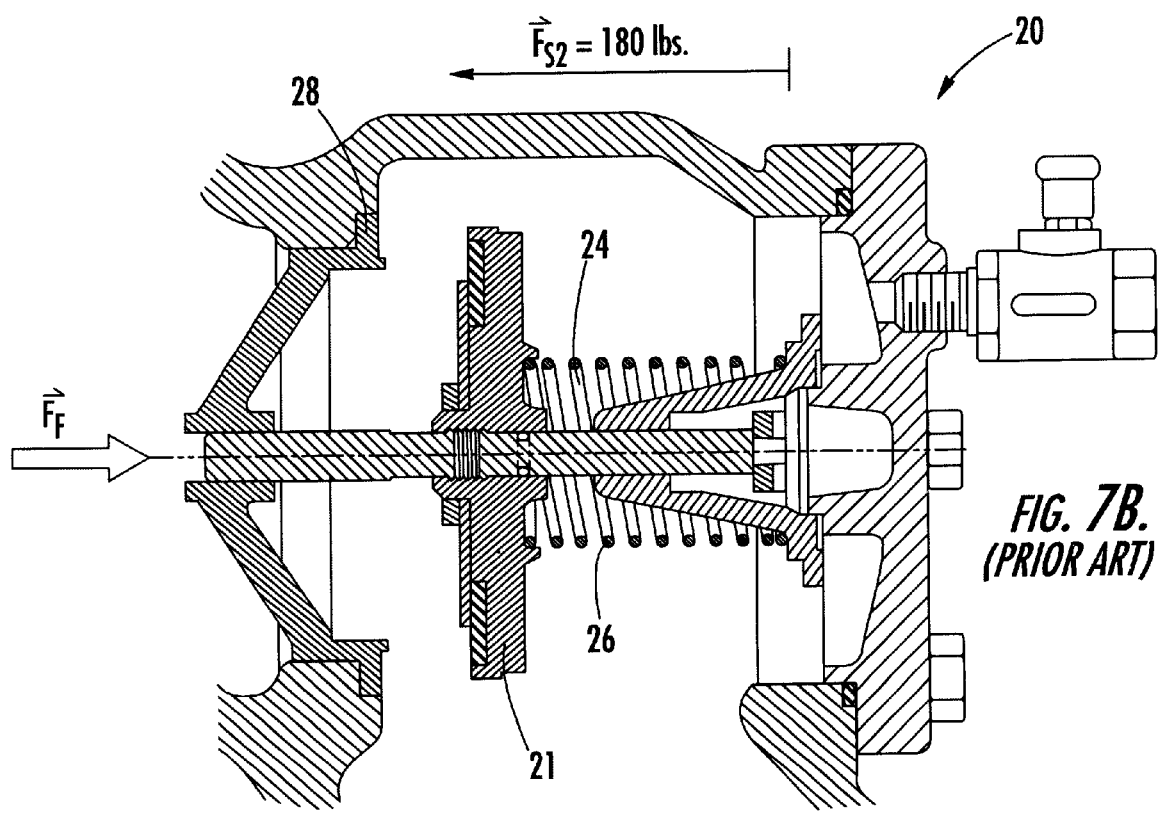

Referring now to FIGS. 7A and 7B, a comparative analysis of some of the key force vectors produced by a prior art check valve and the check valve of the present invention are shown. Using the valve assembly 20 shown in FIGS. 1 and 2 as an example, FIG. 7A shows the force produced by the spring 26 on the seal retainer 21 when there is no fluid flowing through the valve assembly 20. FIG. 7B shows the force produced by the spring 26 on the seal retainer 21 when fluid is flowing freely through the valve assembly 20. While any suitable prior art valve assembly may be used, the valve assembly 20 used in the analysis shown in FIGS. 7A and 7B includes a prior art 4" RP model poppet.

FIG. 7A shows the valve assembly 20 in a closed position, with the seal retainer 21 biased closed against the seat 28 by the spring 26. This closed position is typically maintained when there is no fluid flowing through the backflow preventer 10. In order to maintain the seal retainer 21 closed against the seat 28, the tension of the spring 26 is adjusted so that the spring 26 is compressed along the longitudinal axis of the stem 24, to produce a force ($F_{S1}$) of 150 lbs. against the seal retainer 21. As is shown in FIG. 7B, once fluid begins flowing against the valve assembly 20 in the direction shown, the force of the fluid ($F_F$) against the seal retainer 21 causes the spring 26 to compress further, thereby producing an increased linear force ($FS_{S2}$) against the seal retainer 21 of 180 lbs. The force ($Fs_{S2}$) acts opposite the force of the fluid ($F_F$) and continues to increase in direct proportion to the increased flow of fluid. As discussed above, as the force ($F_{S2}$) increases, the dynamic head loss also increases, which results in a corresponding decrease in fluid pressure and ultimately, in fluid flow.

Referring now to FIG. 8, a comparative analysis of the key force vectors produced by the springs of the present invention are shown. Using the valve assembly 70A shown in FIGS. 3 and 4 as an example, FIG. 8A shows the forces produced by a spring 110 on the stem 90 when there is no fluid flowing through the valve assembly 70A. FIG. 8B shows the forces produced by the spring 110 on the stem 90 when fluid is flowing freely through the valve assembly 70A. The valve assembly 70A is shown in a closed position, with the seal retainer 93 biased closed against the seat 80 by the spring 110. Note that the valve assembly 70A shown in FIG. 8A includes only one spring 110: the other two springs 110 (see FIG. 6) are not shown. Like the prior art valve assembly 20 shown in FIG. 7A, there is no fluid flowing through the valve assembly 70A shown in FIG. 8A. Therefore, in order to maintain the seal retainer 93 closed against the seat 80, the spring 110 is compressed along the longitudinal axis of the stem 90, thereby producing a force ($F_{S3}$) of 97 lbs. on the stem 90. Because the spring 110 is positioned at an oblique angle to the stem 90, a resultant force ($F_{S3X}$) on the stem 90 is created. As shown in FIG. 8A, this resultant force $Fs_{S3X}$ is the horizontal component of force $F_{S3}$, and is equal to 50 lbs. Given that there are three springs 110 positioned at equal, oblique angles to the stem 90 (only one spring is shown), the net resultant force of the three springs ($F_{Net}$) is 150 lbs, which is the force required to maintain the seal retainer 93 in a closed position against the valve seat 80 in the absence of fluid flow.

Referring now to FIG. 8B, the effect of fluid flow on the net resultant force ($F_{Net}$) on the stem is shown. Once fluid begins flowing against the valve assembly 70A in the direction shown, the increased force of the fluid ($F_F$) against the seal retainer 93 causes the spring 110 to pivot in a downstream direction and compress further, thereby producing a force ($F_{S4}$) on the stem 90 of 147 lbs. Once again, because the spring 110 is positioned at an oblique angle to the stem 90, a resultant force ($F_{S4X}$) on the stem 90 is created which is the horizontal component of force ($F_{S4}$), and is equal to 10 lbs. The net resultant force ($F_{Net}$) of the three springs (not shown) is thus 30 lbs, which is substantially less than that produced by the prior art spring 26 shown in FIG. 7B. This decrease in the net resultant force produced by the springs 110 is significant because as fluid flow increases, the net resultant force continues to decrease. As the net resultant force decreases, the dynamic head loss also decreases. This decrease in dynamic head loss is favorable because it results in higher fluid pressure and a corresponding increased rate of fluid flow through the valve assembly 70A, which the prior art valve assemblies having a single spring loaded along the horizontal axis of the valve stem are unable to maintain. Furthermore, even though the net resultant force ($F_{Net}$) decreases, it remains large enough allow the valve assembly 70A to gradually close in response to decreased fluid flow. These positive effects are achieved by positioning the three springs 110 in the valve assembly 70A in radial opposition to one another and at outwardly-extending, oblique angles to the stem 80, as shown in FIG. 6.

Figure 9:
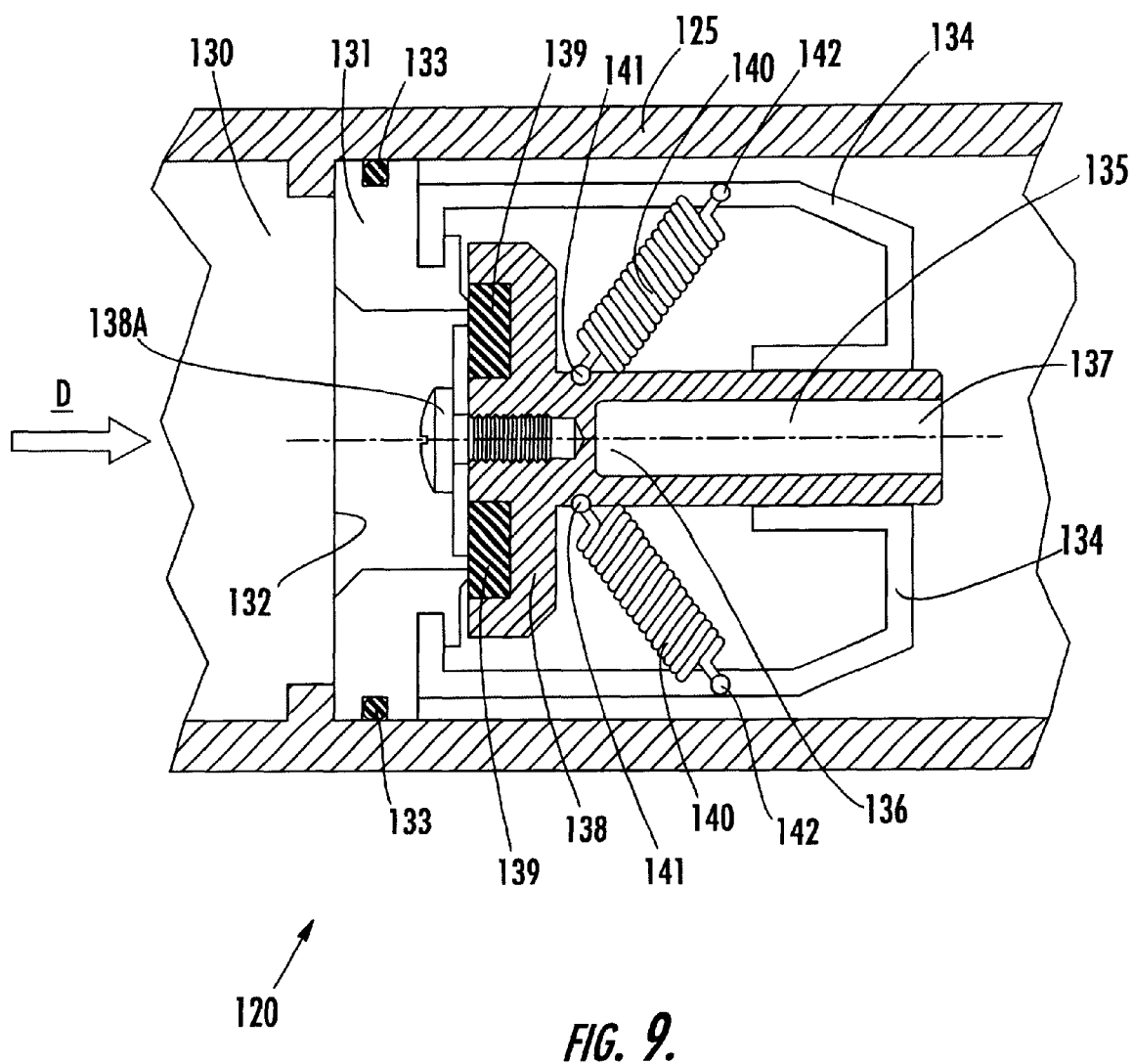
FIG. 9 is a vertical, cross sectional view of a radially loaded, poppet-type check valve according to an alternative embodiment of the present invention in a no-flow condition.

Referring now to FIG. 9, a radially loaded, poppet-type backflow preventer according to an alternative embodiment of the present invention is illustrated and shown generally at reference numeral 120. The backflow preventer 120 includes a check valve assembly 130 positioned within a valve housing 125. Although the backflow preventer 120 shown in FIG. 9 includes only one valve assembly 130, any number of valve assemblies 130 may be used within a single valve housing 125. The valve assembly 130 includes a valve seat 131 frictionally positioned within a port 132 of the valve housing 125. Fluid which is to be controlled by the valve assembly 130 normally flows through the valve seat 131 from upstream to downstream in the direction ("D") shown. An o-ring 133 is positioned in an annular o-ring groove and forms a fluid seal between the valve seat 131 and the valve housing 125. A stem guide 134 receives a horizontally-oriented stem 135 therethrough, and is mounted on the downstream side of the valve seat 131. The stem 135 is positioned within the valve housing 125 and includes first and second respective ends 136 and 137. A seal retainer 138 is attached to the first end 136 by a screw 138A. The seal retainer 138 engages the valve seat 131 and preferably includes two rubber faces 139 attached thereto for providing an enhanced seal between the seal retainer 138 and the valve seat 131.

Although the valve assembly 130 shown in FIG. 9 is in a closed position with the seal retainer 138 engaged with the valve seat 131, the seal retainer 138 may be moved out of engagement with the valve seat 131 using pivotally-mounted springs 140. Each spring 140 interconnects the stem 135 and the stem guide 134. Although any suitable spring may be used, each spring 140 is preferably a compression spring. Only two springs 140 are shown positioned in the valve assembly 130; however, three springs 140 are preferably used and positioned around the stem 135 in a manner identical to that of the springs 110 shown in FIGS. 5 and 7. Referring again to FIG. 10, each spring 140 has first and second respective ends 141 and 142. The first end 141 is pivotally connected to the first end 136 of the stem 135 downstream from the seal retainer 138, and the second end 142 is pivotally connected to the stem guide 134 downstream from the first end 141 of the spring 140 and from the seal retainer 138.

Figure 10:
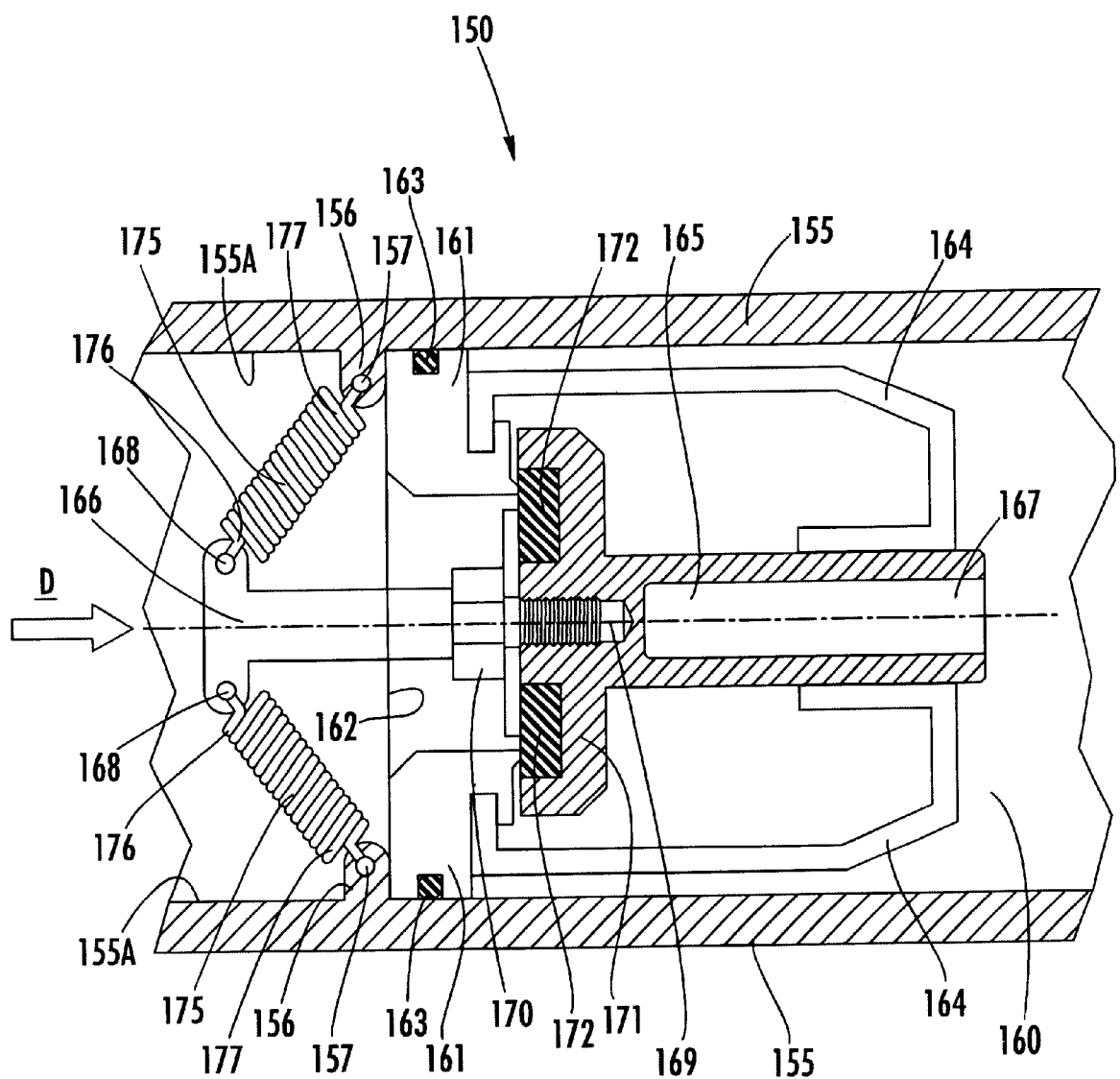
FIG. 10 is a vertical, cross sectional view of a radially loaded, poppet-type check valve according to a further alternative embodiment of the present invention in a no-flow condition.

Referring now to FIG. 10, a radially loaded, poppet-type backflow preventer according to another preferred embodiment of the present invention is illustrated and shown generally at reference numeral 150. The backflow preventer 150 includes a check valve assembly 160 positioned within a valve housing 155. While the backflow preventer 150 includes many of the same components as the backflow preventer 120, the manner in which the components are positioned within the valve housing differs significantly.

The backflow preventer 150 shown in FIG. 10 includes only one valve assembly 160; however any number of valve assemblies 160 may be used within the single valve housing 155. The valve assembly 160 includes a valve seat 161 frictionally positioned within a port 162 of the valve housing 165. Fluid which is to be controlled by the valve assembly 160 normally flows through the valve seat 161 from upstream to downstream in the direction shown. An o-ring 163 is positioned in an annular o-ring groove and forms a fluid seal between the valve seat 161 and the valve housing 155. Three anchors 156 (only two are shown in FIG. 10), each of which has a hole 157 defined therethrough, are integrally formed with an inner wall 155A of the valve housing 155 immediately upstream from the valve seat 161. A stem guide 164 is mounted on the downstream side of the valve seat 161 for guiding a horizontally-oriented stem 165 therethrough. The stem 165 includes a forward end 166 extending through and upstream from the valve seat 161, and a rearward end 167 extending downstream from the valve seat 161 and through the stem guide 164. As discussed in detail below, the forward end 166 has holes 168 defined therethrough. Each hole 168 receives a first end 176 of a respective one of the springs 177 therein. The forward end 166 is attached to the rearward end 167 by a threaded bolt 169. A nut 170 is secured around the bolt 169 and is for holding the forward end 166 in place and adjusting the tension of the springs.

A seal retainer 171 is integrally formed with the stem 165 and engages the valve seat 161. The seal retainer 171 preferably includes two rubber faces 172 for providing an enhanced seal between the seal retainer 171 and the valve seat 161. The seal retainer 171 maybe moved in and out of engagement with the valve seat 161 using pivotally-mounted springs 175. Although any suitable spring may be used, each spring 175 is preferably a compression spring. Only two springs 175 are shown positioned in the valve assembly 160; however, three springs 175 are preferably used and positioned radially opposite one another and attached around the forward end 166 of the stem 165 in manner similar to that of the springs 110 shown in FIG. 6. Referring again to FIG. 10, each spring 175 has first and second respective ends 176 and 177. The first end 176 is attached to the forward end 166 of stem 165 through the hole 168. The second end 177 is attached to one of the anchors 156 through the corresponding hole 157.

Figure 11:
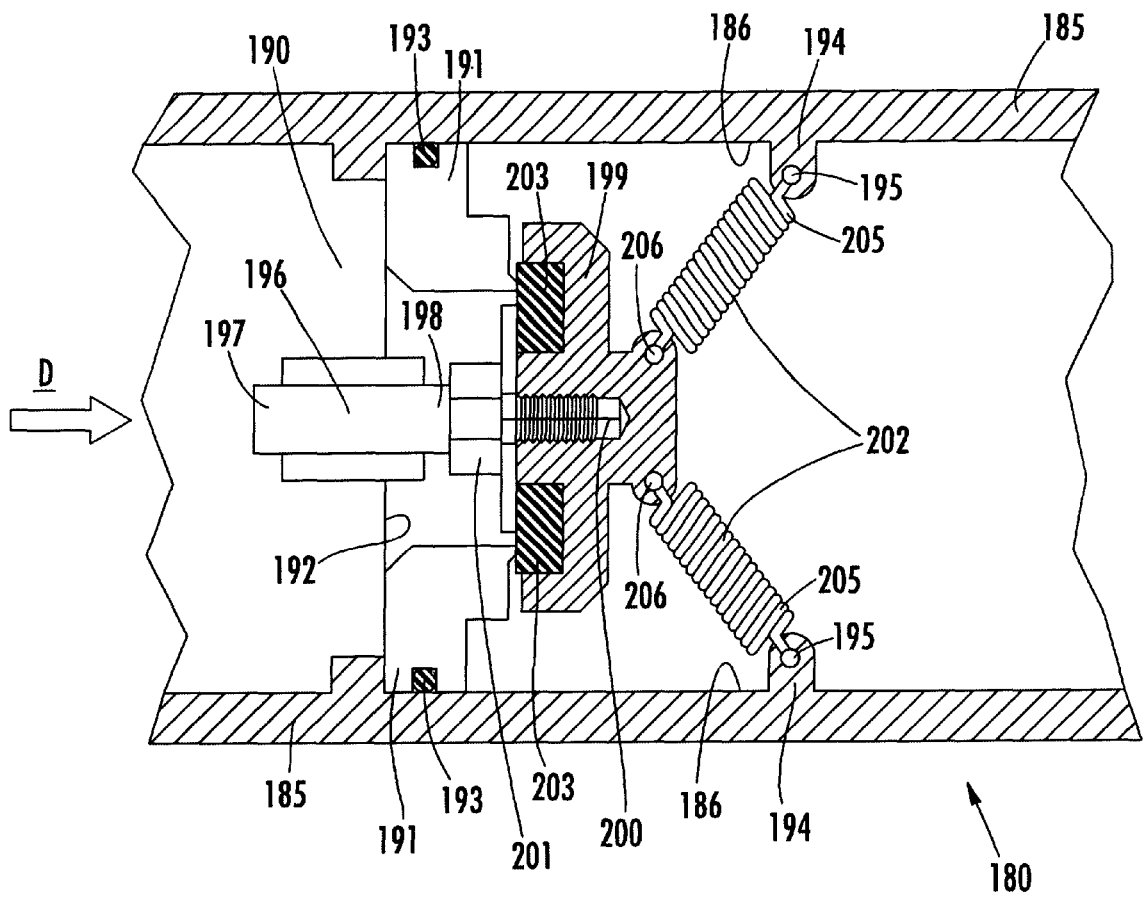
FIG. 11 is a vertical, cross sectional view of a radially loaded, poppet-type check valve according to a further alternative embodiment of the present invention in a no-flow condition.
Figure 12:
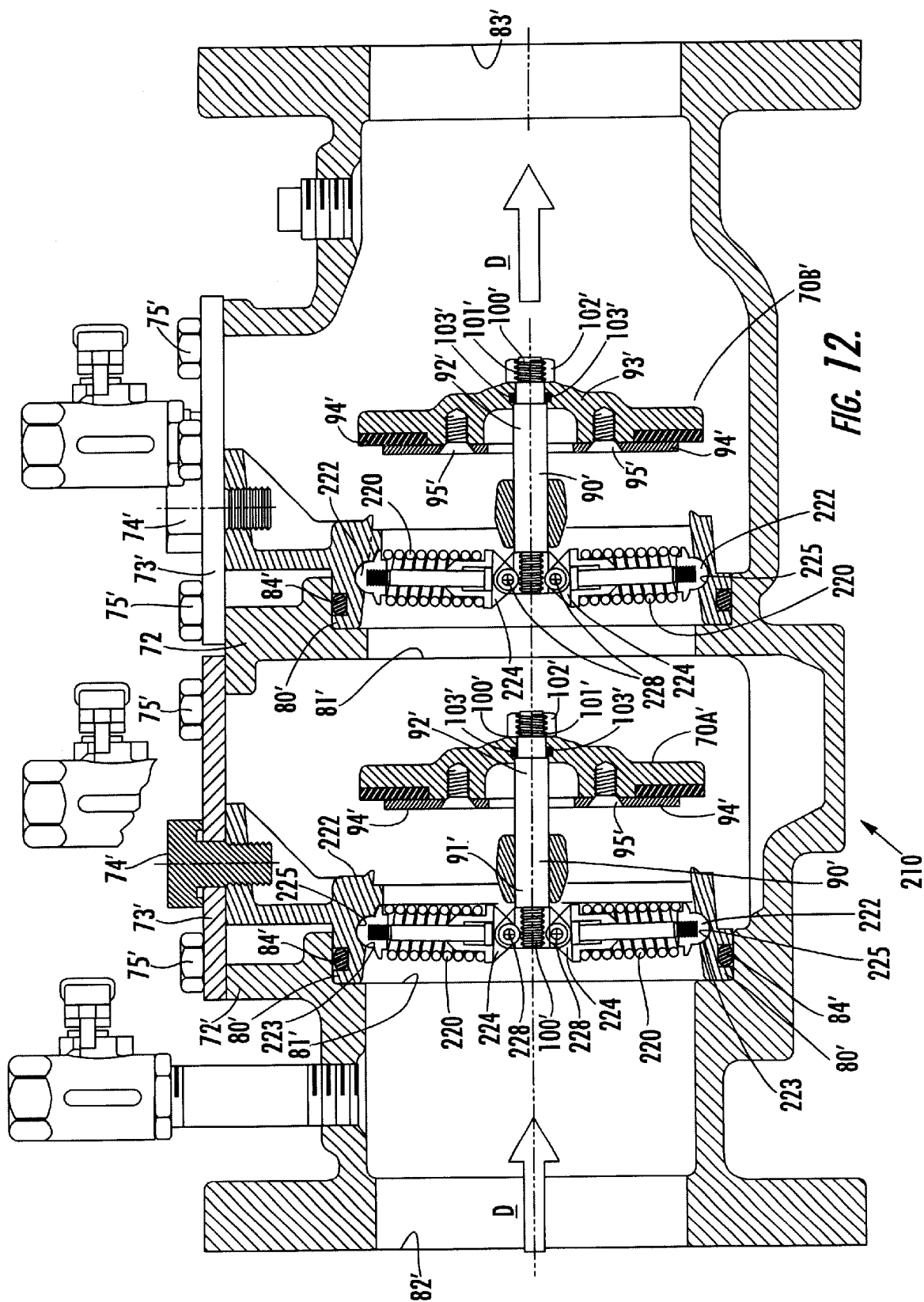
FIG. 12 is a cut-away, vertical, cross sectional view of the radially loaded, poppet-type check valve according to a further alternative embodiment of the present invention in a full-flow condition.

Referring now to FIG. 11, a radially loaded, poppet-type backflow preventer according to another preferred embodiment of the present invention is illustrated and shown generally at reference numeral 180. The backflow preventer 180 includes a check valve assembly 190 positioned within a valve housing 185. Although the backflow preventer 180 shown in FIG. 12 includes only one valve assembly 190, any number of valve assemblies 190 may be used within a single valve housing 185. The valve assembly 190 includes a valve seat 191 frictionally positioned within a port 192 of the valve housing 185. Fluid which is to be controlled by the valve assembly 190 normally flows through the valve seat 191 from upstream to downstream in the direction shown. An o-ring 193 is positioned in an annular o-ring groove (not shown) and forms a fluid seal between the valve seat 191 and the valve housing 185. Three anchors 194 (only two anchors 194 are shown in FIG. 12), each of which has a hole 195 defined therethrough, are integrally formed with an inner wall 186 of the valve housing 185 downstream from the valve assembly 190. The valve assembly 190 includes a horizontally-oriented stem 196 having a forward end 197 extending through and upstream from the valve seat 191, and a second end 198 positioned within the valve seat 191.

A seal retainer 199 is engaged with the valve seat 191 for sealing the valve assembly 190 in a closed position and preventing fluid from flowing therethrough. The seal retainer 199 is attached to the second end 198 of the stem 196 by a threaded bolt 200. A nut 201 is secured around the bolt 200 and is for holding the seal retainer in place and adjusting the tension of three springs 202, which are discussed in greater detail below. The seal retainer 199 also preferably includes two rubber faces 203 for providing an enhanced seal between the seal retainer 199 and the valve seat 191. Pivotally-mounted springs 202 are used to move the seal retainer 199 in and out of engagement with the valve seat 191. While any suitable spring may be used, each spring 202 is preferably a compression spring. FIG. 11 shows only two springs 202 positioned in the valve assembly 190; however, three springs 202 are preferably used and are positioned radially opposite one another in manner similar to that of the springs 110 shown in FIG. 6. Referring again to FIG. 11, each spring 202 has first and second respective ends 204 and 205. Three holes 206 (only two holes 206 are shown in FIG. 11) are defined in the upstream end of the seal retainer 199. Each hole 206 receives the first end 204 of a respective one of the springs 202 therein. The second end 205 is attached to one of the anchors 194 through a corresponding hole 195.

Referring now to FIG. 12, a radially loaded, poppet-type backflow preventer according to another preferred embodiment of the present invention is illustrated and shown generally at reference numeral 210. Note that with the exception of the springs, the components of the backflow preventer 210 are the same as those of the backflow preventer 70 shown in FIGS. 3 and 4. Like elements are thus shown in FIG. 12 using prime reference numerals.

Like the seal retainer 93 shown in FIGS. 3 and 4, the seal retainer 93' shown in FIG. 12 is moved in and out of engagement with the valve seat 80' by pivotally-mounted springs 110' (not shown); however, unlike the springs 110 of the backflow preventer 70, the springs 110' are housed within a telescoping subassembly 220 which is pivotally attached to the valve seat 80' and the first end 91' of the stem 90' by a spherically-shaped end 222 and a hinged end 224, respectively. End 222 carries a pivot in the form of a convex surface 223. While only two telescoping subassemblies 220 are positioned within each of the valve assemblies 70A' and 70B' shown in FIG. 13, the use of three subassemblies 220 positioned around each valve assembly 70A' and 70B' in a manner identical to that of the springs 110 shown in FIG. 6 is preferred.

Referring again to FIG. 12, the convex surface 223 of each subassembly 220 engages a complementary concave surface 225 formed on an inside surface of the valve seat 80', thereby permitting end 222 to pivot in any direction. Hinged end 224 is preferably a knuckle joint. The first end 91' of the stem 90' and the hinged end 224 define respective holes 226 and 227 (not shown), which are adapted for receiving a complementary hinge pin 228 therethrough. Each hinged end 224 is positioned on the first end 91' of the stem 90' upstream from the point at which the corresponding convex surface 223 communicates with a respective concave surface 225. Positioning each subassembly 220 at an oblique angle to the stem 90' in this manner results in a diminishing net resultant force produced by each subassembly 220 on the stem 90' which conserves total energy within the backflow preventer 210 by maintaining proper fluid pressure and flow therein.

Figure 13:
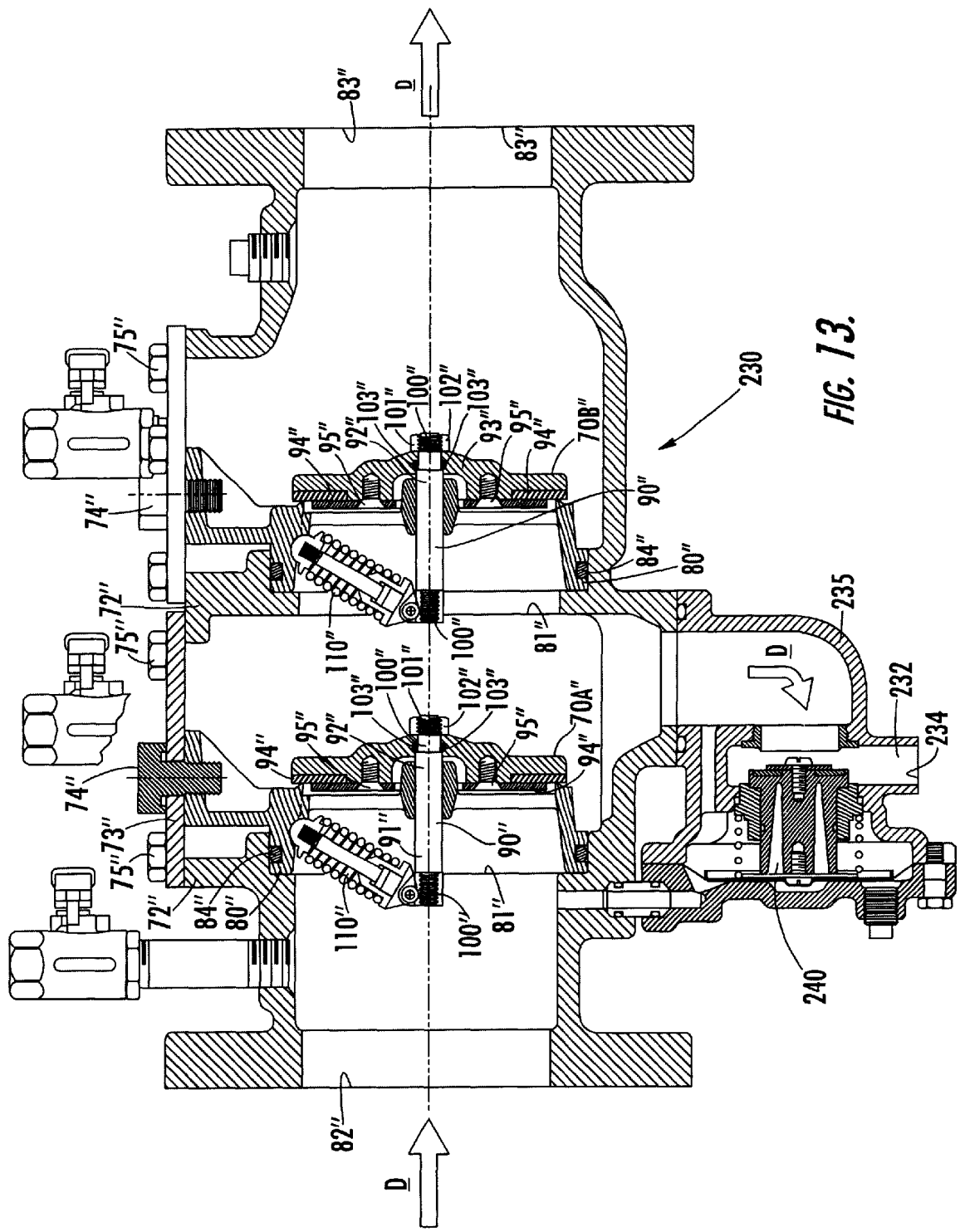
FIG. 13 is a vertical, cross sectional view of a radially loaded, poppet-type check valve according to a further alternative embodiment of the present invention in a no-flow condition.

Referring now to FIG. 13, a radially loaded, poppet-type backflow preventer according to another preferred embodiment of the present invention is illustrated and shown generally at reference numeral 230. Note that with the exception of an additional conduit, the components of the backflow preventer 230 are the same as those of the backflow preventer 70 shown in FIGS. 3 and 4. Like elements are thus shown in FIG. 13 using double prime reference numerals. As is shown in FIG. 13, fluid which is to be controlled by the valve assemblies 70A" and 70B" normally flows upstream to downstream in the direction "D" shown not only from inlet conduit 81" through valve assemblies 70A" and 70B", respectively, to outlet conduit 83", but also from an intermediate inlet conduit 232 through a port 234 of an intermediate valve housing 235. Fluid flow through intermediate inlet conduit 232 is controlled by a prior art valve assembly 240 which is removably positioned within the port 234.

Radially loaded, poppet-type check valves for controlling fluid flow have been disclosed. Various details of the invention may be changed without departing from its scope. Furthermore, the foregoing description of the preferred embodiments of the invention and the best mode for practicing the invention are provided for the purpose of illustration only and not for the purpose of limitation—the invention being defined by the claims.

I claim:

1. A poppet-type check valve for controlling fluid flow, comprising:
    (a) a valve housing having an interior and first and second ports therein communicating with the interior of said valve housing for permitting fluid flow from an upstream side to a downstream side thereof;
    (b) at least one valve assembly disposed within the interior of the valve housing for controlling the fluid flow therethrough, said valve assembly including:
        (i) a valve seat positioned in the interior of the valve housing;
        (ii) a seal retainer positioned in the interior of the valve housing downstream from the valve seat and mounted on a stem, said seal retainer and said stem axially moveable away from the valve seat in response to fluid flow in a downstream direction, movable toward the valve seat in response to fluid flow in an upstream direction, and in sealing engagement against in the absence of fluid flow; and
        (iii) a plurality of springs pivotally mounted in the interior of the valve housing and interconnecting the valve seat and stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs 2. A poppet-type check valve for controlling fluid flow, comprising:
    (a) a valve housing having an interior and first and second ports therein communicating with the interior of said valve housing for permitting fluid flow from an upstream side to a downstream side thereof;
    (b) at least one valve assembly disposed within the interior of the valve housing for controlling the fluid flow therethrough, said valve assembly including:
        (i) a valve seat positioned in the interior of the valve housing;
        (ii) a stem guide mounted on a downstream side of said valve seat;
        (iii) a seal retainer mounted on an upstream end of a stem extending downstream from said valve seat and through said stem guide, said seal retainer and said stem axially moveable away from the valve seat in response to fluid flow in a downstream direction, movable toward the valve seat in response to fluid flow in an upstream direction, and in sealing engagement against the valve seat in the absence of fluid flow; and
        (iv) a plurality of springs pivotally mounted in the interior of the valve housing interconnecting the stem and the stem guide downstream from the seal retainer for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response the valve seat in response to fluid flow in an upstream direction, and in sealing engagement against the valve seat in the absence of fluid flow;
        (v) a plurality of springs pivotally mounted in the interior of the valve housing upstream from the valve seat and interconnecting the valve housing and the first end of the stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

3. A poppet-type check valve for controlling fluid flow, comprising:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

(i) a valve seat positioned in the interior of the valve housing;

(ii) a stem guide mounted on a downstream side of said valve seat;

(iii) a stem positioned within the valve seat and including first and second ends extending upstream from the valve seat and downstream from the valve seat through the stem guide, respectively;

(iv) a seal retainer mounted on said stem intermediate with said first and second ends and positioned downstream from the valve seat, said seal retainer and the stem axially moveable away from the valve seat in response to fluid flow in a downstream direction, movable toward the valve seat in response to fluid flow in an upstream direction, and in sealing engagement against the valve seat in the absence of fluid flow;

(v) a plurality of springs pivotally mounted in the interior of the valve housing interconnecting the valve housing and the first end of the stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

4. A poppet-type check valve for controlling fluid flow, comprising:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

(i) a valve seat positioned in the interior of the valve housing;

(ii) a stem having a first end extending through and upstream from said valve seat and a second end positioned within the valve seat;

(iii) a seal retainer mounted on said second end and positioned downstream from the valve seat, said seal retainer and said stem axially moveable away from the valve seat in response to fluid flow in a downstream direction, axially movable toward the valve seat in response to fluid flow in an upstream direction, and in sealing engagement against the valve seat in the absence of fluid flow;

(iii) a plurality of springs pivotally mounted in the interior of the valve housing interconnecting the valve housing and the seal retainer for normally maintaining the seal retainer in sealing engagement with the valve seat in the absence of fluid flow, said springs positioned in radial opposition to one another and extending outwardly from the seal retainer in the downstream direction to cause the seal retainer to move away from the valve seat in response to fluid flow in the downstream direction, thereby increasing the force of the seal retainer on the springs and causing the springs to pivot and compress to produce a diminishing resultant spring load on the seal retainer.

5. A poppet-type check valve according to claims 1, 2, 3 or 4, wherein each of said springs is positioned for being axially compressed and expanded between two angles responsive to the movement of the seal retainer, each of said angles oblique to the direction of fluid flow through the valve housing.

6. A poppet-type check valve according to claim 5, wherein said valve assembly includes three springs, each of said springs having first and second ends.

7. A poppet-type check valve according to claim 6, wherein said springs are positioned in equally-spaced relation to one another.

8. A poppet-type check valve according to claim 7, wherein said first ends are positioned on the stem in equally-spaced relation to one another, and said second ends are positioned 120 degrees apart from one another and extend downstream from said first ends.

9. A poppet-type check valve according to claim 8, wherein said springs are compression springs.

10. A backflow preventer for protecting fluid sources from pollutants, comprising at least one poppet-type check valve for controlling fluid flow removably mounted therein, said check valve including:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

(i) a valve seat positioned in the interior of the valve housing;

(ii) a seal retainer positioned in the interior of the valve housing downstream from the valve seat and mounted on a stem, said seal retainer and said stem axially moveable away from the valve seat in response to fluid flow in a downstream direction, axially movable toward the valve seat in response to fluid flow in an upstream direction, and in sealing engagement against the valve seat in the absence of fluid flow; and (iii) a plurality of springs pivotally mounted in the interior of the valve housing interconnecting the valve seat and stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

11. A backflow preventer for protecting fluid sources from pollutants, comprising at least one poppet-type check valve for controlling fluid flow removably mounted therein, said check valve including:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

(i) a valve seat positioned in the interior of the valve housing;

(ii) a stem guide mounted on a downstream side of said valve seat;

(iii) a seal retainer mounted on an upstream end of a stem extending downstream from said valve seat and through said stem guide, said seal retainer and said stem axially moveable away from the valve seat in response to fluid flow in a downstream direction, axially movable toward the valve seat in response to fluid flow in an upstream direction, and in sealing engagement against the valve seat in the absence of fluid flow; and (iv) a plurality of springs pivotally mounted in the interior of the valve housing interconnecting the stem and the stem guide downstream from the seal retainer for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction thereby increasing the force of the stem on the springs and causing the springs to pivot and compress to produce a diminishing resultant spring load on the stem.

12. A backflow preventer for protecting fluid sources from pollutants, comprising at least one poppet-type check valve for controlling fluid flow removably mounted therein, said check valve including:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

the force of the stem on the springs and causing the springs to pivot and compress to produce a diminishing resultant spring load on the stem.

13. A backflow preventer for protecting fluid sources from pollutants, comprising at least one poppet-type check valve for controlling fluid flow removably mounted therein, said check valve including:

(a) a valve housing having an interior and first and second ports therein communicating with the interior of said valve housing for permitting fluid flow from an upstream side to a downstream side thereof;

(b) at least one valve assembly disposed within the interior of the valve housing for controlling the fluid flow therethrough, said valve assembly including:

(i) a valve seat positioned in the interior of the valve housing;

(ii) a stem having a first end extending through and upstream from said valve seat and a second end positioned within the valve seat;

(iii) a seal retainer mounted on said second end and positioned downstream from the valve seat, said seal retainer and said stem axially moveable away from the valve seat in response to fluid flow in a downstream direction, axially movable toward the valve seat in response to fluid flow in an upstream direction, and in sealing engagement against the valve seat in the absence of fluid flow;

(iii) a plurality of springs pivotally mounted in the interior of the valve housing interconnecting the valve housing and the seal retainer for normally maintaining the seal retainer in sealing engagement with the valve seat in the absence of fluid flow, said springs positioned in radial opposition to one another and extending outwardly from the seal retainer in the downstream direction to cause the seal retainer to move away from the valve seat in response to fluid flow in the downstream direction, thereby increasing the force of the seal retainer on the springs and causing the springs to pivot and compress to produce a diminishing resultant spring load on the seal retainer.

14. A backflow preventer according to claims 10, 11, 12, or 13, wherein each of said springs is positioned for being axially compressed and expanded between two angles responsive to the movement of the seal retainer, each of said angles oblique to the direction of fluid flow through the valve housing.

15. A backflow preventer according to claim 14, wherein said valve assembly includes three springs, each of said springs having first and second ends.

16. A backflow preventer according to claim 15, wherein said springs are positioned in equally-spaced relation to one another.

17. A backflow preventer according to claim 16, wherein said first ends are positioned on the stem in equally-spaced relation to one another, and said second ends are positioned 120 degrees apart from one another and extend downstream from said first ends.

18. A backflow preventer according to claim 17, wherein said springs are compression springs.

* * * * *

UNITED STATES PATENT AND TRADEMARK OFFICE
CERTIFICATE OF CORRECTION

PATENT NO. : 6,443,184 B1
DATED : September 3, 2002
INVENTOR(S) : Robert V. Funderburk It is certified that error appears in the above-identified patent and that said Letters Patent is hereby corrected as shown below:

Column 14,
Line 17, after "springs" insert -- and causing the springs to pivot and compress to produce a diminishing resultant sping load on the stem. --

Line 49, after "response" delete "the valve seat in response to fluid flow in an upstream direction, and in sealing engagement against the valve seat in the absence of fluid flow"; and insert -- to fluid flow in the downstream direction thereby increasing the force of the stem on the springs and causing the springs to pivot and compress to produce a diminishing resultant sping load on the stem. --

Lines 53-66, delete

"(v) a plurality of springs pivotally mounted in the interior of the valve housing upstream from the valve seat and interconnecting the valve housing and the first end of the stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

Column 15,
Line 26, after "housing" insert -- upstream from the valve seat and --

Column 16,
Line 44, after "including:" delete "the force of the stem on the springs and causing the springs to pivot and compress to produce a diminishing resultant spring loan on the stem." and insert --

(i) a valve seat positioned in the interior of the valve housing;

(ii) a stem guide mounted on a downstream side of said valve seat;

(iii) a stem positioned within the valve seat and including first and second ends extending upstream from the valve seat and downstream from the valve seat through the stem guide, respectively;

(iv) a seal retainer mounted on said stem intermediate with said first

UNITED STATES PATENT AND TRADEMARK OFFICE
CERTIFICATE OF CORRECTION

PATENT NO.   : 6,443,184 B1
DATED        : September 3, 2002
INVENTOR(S)  : Robert V. Funderburk It is certified that error appears in the above-identified patent and that said Letters Patent is hereby corrected as shown below:

and second ends and positioned downstream from the valve seat, said seal retainer and the stem axially moveable away from the valve seat in response to fluid flow in a downstream direction, axially moveable toward the valve seat in response to fluid flow in an upstream direction, and in sealing engagement against the valve seat in the absence of fluid flow;

(v) a plurality of springs pivotally mounted in the interior of the valve housing upstream from the valve seat and interconnecting the valve housing and the first end of the stem for normally maintaining the seal retainer in sealing engagement with the valve seat in the absence of fluid flow, said springs positioned in radial opposition to one another and extending outwardly from the stem in the downstream direction to cause the seal retainer to move away from the valve seat in response to fluid flow in the downstream direction, thereby increasing the force of the stem on the springs and causing the springs to pivot and compress to produce a diminishing resultant spring load on the stem.

--

Signed and Sealed this

Twenty-second Day of April, 2003

JAMES E. ROGAN
*Director of the United States Patent and Trademark Office*